United States Patent
Maeda (10) Patent No.: US 6,877,202 B2
(45) Date of Patent: Apr. 12, 2005

(54) METHOD OF MANUFACTURING A THREADED JOINT FOR OIL WELL PIPES

(75) Inventor: Jun Maeda, Ashiya (JP)

(73) Assignees: Sumitomo Metal Industries, Ltd., Osaka (JP); Vallourec Mannesmann Oil & Gas France, Aulnoye-Ameries (FR)

( * ) Notice: Subject to any disclaimer, the term of this patent is extended or adjusted under 35 U.S.C. 154(b) by 12 days.

(21) Appl. No.: 10/663,725

(22) Filed: Sep. 17, 2003

(65) Prior Publication Data

US 2004/0123442 A1 Jul. 1, 2004

Related U.S. Application Data

(63) Continuation of application No. PCT/JP01/02155, filed on Mar. 19, 2001.

(51) Int. Cl.$^7$ ............................................. F16L 21/00
(52) U.S. Cl. ............................... 29/407.01; 29/407.05; 29/407.1; 285/331; 285/332; 285/369; 285/374
(58) Field of Search ......................... 29/407.01, 407.05, 29/407.09, 407.1; 285/331, 332, 369, 374

(56) References Cited

U.S. PATENT DOCUMENTS

| | | | | |
|---|---|---|---|---|
| 4,384,737 A | * | 5/1983 | Reusser | 285/334 |
| 4,537,429 A | * | 8/1985 | Landriault | 285/334 |
| 4,538,440 A | * | 9/1985 | Kottke | 72/189 |
| 4,611,838 A | * | 9/1986 | Heilmann et al. | 285/331 |
| 5,263,748 A | * | 11/1993 | Carstensen | 285/333 |

FOREIGN PATENT DOCUMENTS

| | | |
|---|---|---|
| JP | 08-135855 | 5/1996 |
| JP | 09-119565 | 5/1997 |
| JP | 10-318453 | 12/1998 |
| JP | 2000-081173 | 3/2000 |
| JP | 2001-082644 | 3/2001 |

* cited by examiner

Primary Examiner—David P. Bryant
Assistant Examiner—Jermie E. Cozart
(74) Attorney, Agent, or Firm—Clark & Brody (57) ABSTRACT

A method of manufacturing a threaded joint for oil well pipe having a pin part with a male thread, a box part with a female thread, metal seal parts provided on the pin part and the box part, respectively, and torque shoulder parts provided at the tip of the pin part and at the portion of the box part coming in contact with the tip of the pin part, respectively, comprising the step of providing a design procedure for determining the dimensions of each part, whereby an highly strong threaded joint showing an excellent leak resistance to internal and external pressures can be designed and manufactured.

16 Claims, 3 Drawing Sheets

METHOD OF MANUFACTURING A THREADED JOINT FOR OIL WELL PIPES

This application is a continuation of International Patent Application No. PCT/JP01/02155, filed Mar. 19, 2001. This PCT application was not in English as published under PCT Article 21 (2).

TECHNICAL FIELD

This invention relates to a method of manufacturing a threaded joint for a pipe, and in particular to a method of manufacturing a threaded joint having resistance to various external forces which is comparable to or greater than that of the body of the pipe.

Some examples of such a pipe are pipes which constitute oil wells, gas well, and geothermal wells for the exploration and production of petroleum, natural gas, steam, and hot water, and injection wells for injecting waste materials or gas, water, and the like into the ground, and the like (represented below by oil wells). Accordingly, more specifically, this invention relates to a method of manufacturing a threaded joint for such pipes (represented below by oil well pipes).

BACKGROUND ART

Threaded joints have been used as joints for such oil well pipes. The most commonly used type is a round thread joint or a buttress thread joint meeting API specifications (American Petroleum Institute specifications) (also referred to below as an "API joint"). Recently, oil wells, gas wells, and the like are becoming deeper, and at the same time, the pressure, the temperature, and the corrosive conditions inside wells are becoming increasingly severe. For such environments, there has come to be a demand for a joint having a strength which can resist breakage under the weight of pipes and which also has excellent airtightness.

Figure 1A:
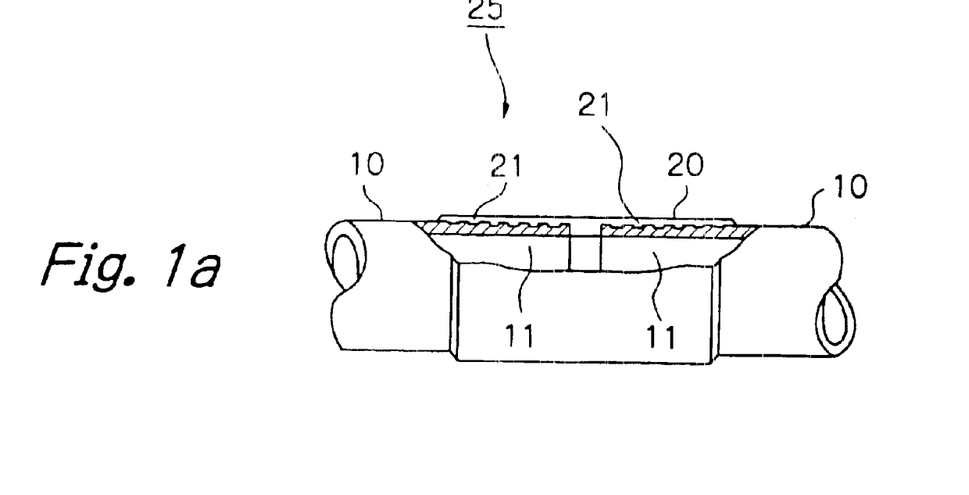
FIG. 1a is a cross-sectional view including a pipe axis showing a coupling-type threaded joint for an oil well pipe for connecting a coupling having two box portions at its ends and pipes each having a pin portion at its end.
Figure 1B:
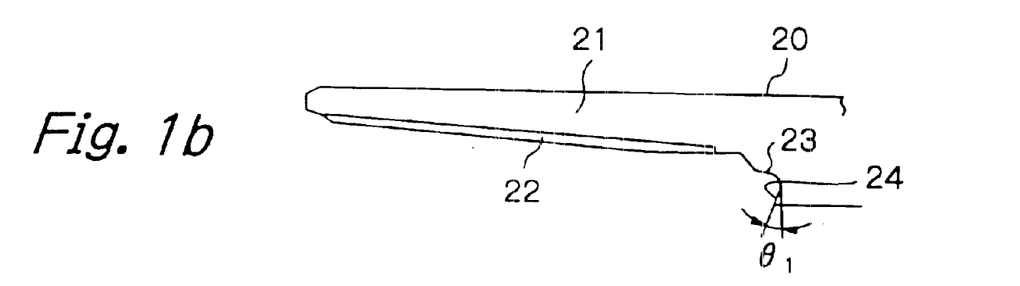
FIG. 1b is an enlarged cross-sectional view of the box portion of a coupling.
Figure 1C:
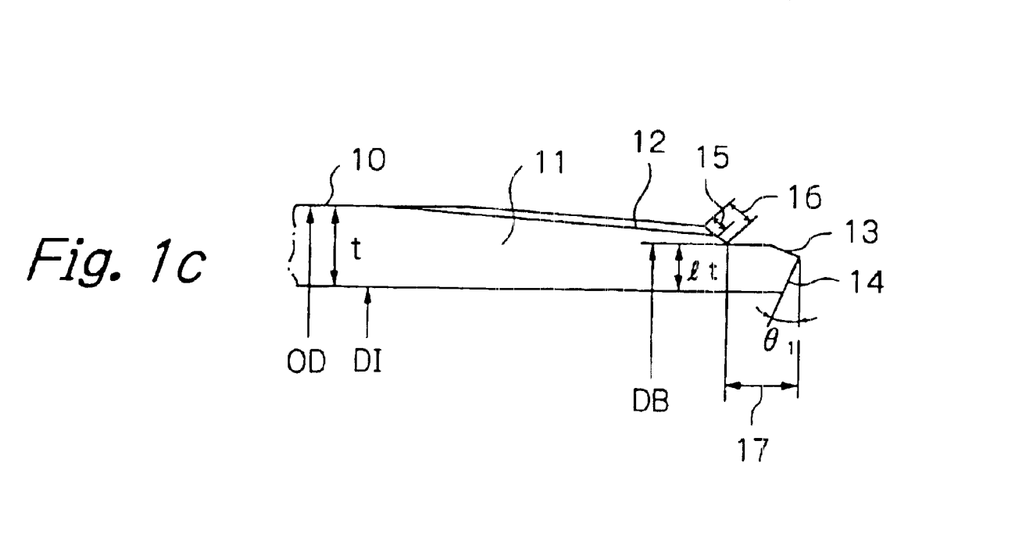
FIG. 1c is an enlarged cross-sectional view of a pin portion of a pipe.

As one example thereof, FIG. 1a is a cross-sectional view showing a coupling-type threaded joint 25 for an oil well pipe for connecting a coupling 20 having box portions 21, 21 at each end and pipes 10, 10 having pin portions 11, 11 at the ends thereof. FIG. 1b is an enlarged cross-sectional view of a box portion 21 of the coupling 20, and FIG. 1c is an enlarged cross-sectional view of the pin portion 11 of a pipe 10.

As shown in FIG. 1a, the box portions 21, 21 are provided at both ends of the coupling 20, and the pin portions 11, 11 are provided on the ends of the pipes 10, 10. The pipes 10, 10 which are steel pipes in the case of oil well pipes are threadingly connected by the coupling 20.

As shown in FIG. 1b, a female thread 22 is formed on the inner peripheral surface of the box portion 21. In addition, as shown in FIG. 1c, a male thread 12 is formed on the outer peripheral surface of the pin portion 11.

In this manner, a coupling-type threaded joint 25 connects two pipes 10, 10 by screwing the pin portions 11 having male threads 12 provided on the ends of the pipes 10 into box portions 21 having female threads 22 provided on the interior of the coupling 20.

However, as stated above, a joint comprising only threaded elements in the form of males threads 12 and female threads 22 such as an API joint was not sufficient to meet the demands of a threaded joint 25 having a sufficient strength to resist tensile stresses generated by the weight of the pipes 10 and having a high degree of airtightness. Therefore, as respectively shown in FIG. 1b and FIG. 1c, a threaded joint 25 having metal seal portions 13, 23 and torque shoulder portions 14, 24 on the box portion 21 and the pin portion 11, respectively, has come to be used.

The metal seal portions 13, 23 are provided in order to guarantee a suitable contact surface pressure. The pipes 10 have interference in the radial direction, i.e., the outer diameter of the metal seal portions 13 of the pin portions 11 is larger than the inner diameter of the metal seal portions 23 of the box portions 21 (this difference is called the "interference amount"). When the pin portions 11 are screwed into the box portions 21, due to the existence of this interference amount, a surface pressure is generated in the contact surfaces of both metal seal portions 13, 23, and good airtightness is guaranteed by this surface pressure.

The torque shoulders 14, 24 are provided in order to guarantee a suitable contact surface pressure between them. Namely, by abutting these portions of the pin portion 11 and the box portion 21 against each other with a suitably controlled pressure, a sufficient amount of threaded engagement is guaranteed, coupling of the threaded joint 25 is performed with certainty, and due to the abutting force, a supplemental contact surface pressure is generated in the metal seal portions 13 and 23.

In the case of a tapered thread, in order to perform coupling with certainty and to prevent ready loosening, there are many cases in which an interference in the same amount as that in the metal seal portions 13, 23 is provided between the male thread 12 and the female thread 22.

The angle of slope $\theta_1$ of the torque shoulders 14, 24 with respect to a perpendicular surface is referred to as the shoulder angle.

DISCLOSURE OF THE INVENTION

In recent years, the depth of wells has been becoming increasingly deep, and the environment of development and the environment of wells are worsening. At the same time, the technology for developing oil well and gas wells is advancing, and recently, severe demands like the following (1)–(5) have come to be made of joints.

(1) To withstand tensile stress in the axial direction due to the weight of connected pipes.

(2) To withstand internal pressure due to internal fluids, and to withstand external pressure due to external fluids.

(3) For repeated reuse to be possible in light of the tendency for the corrosion-resistant materials for pipes to become expensive.

(4) To have sufficient resistance with respect to twisting forces applied to pipes and with respect to tensile forces and compressive forces which are generated by repeated heating and cooling and the like during the development of an oil well or during operation of an oil well.

(5) To maintain a seal with respect to internal and external pressures even when such loads are repeatedly received.

In order to respond to such demands, from in the past, there have been many proposals of inventions for improving the state of coupling of a threaded joint 25 like that shown in FIG. 1a–FIG. 1c. The present inventors also made a proposal in Japanese Patent Application Hei 11-183148 (see Japanese Published Unexamined Patent Application No. 2000-81173).

By satisfying the following items (i)–(iv), or (i)–(iii) and (v), that proposal can provide a threaded joint which has a resistance at a level the same of greater than that of a pipe body under all applicable loads to a threaded joint.

Namely, it provides a threaded joint for an oil well pipe which satisfies the entire region of internal pressure and axial force shown by the Von Mises corresponding stress ellipse, and the entire region of external pressure and axial force shown by the formula for pipe collapse specified by API 5C3, and which maintains airtightness under a varying axial force, and particularly after undergoing a high compressive force of 95% of the pipe strength, and which does not readily loosen under a varying tensile and compressive axial force.

(i) The load flank angle of the thread is at least −20° and less than 0°, the stabbing flank angle is greater than 25° and at most 45°, the thread interference amount is a positive value, the load flanks and the stabbing flanks of the male thread and the female thread contact each other during coupling and at the completion of coupling of the joint, and a gap is provided between the crest and the root of the threads. The "thread interference amount" is defined as the difference between the pitch circle diameters of the male thread and the female thread.

(ii) Of the values which are calculated for the thread interference amount using the below-described Equation 1 and Equation 2 over the entire length of the threaded portion, two times the smallest value is made the upper limit, and 5% of the upper limit is made the lower limit.

$$It = \frac{\delta y \cdot La^2 \cdot (1 + DI^2/La^2 + dp^2/Lb^2)}{E \cdot dp} \quad (1)$$

Here, $$It = \frac{2 \cdot \delta y \cdot Lb^2 \cdot dp \cdot (1 + DI^2/La^2 + dp^2/Lb^2)}{E \cdot (W^2 + dp^2)} \quad (2)$$

It: apparent interference amount (mm) over the radius
δy: yield strength (MPa) of the material of the joint
E: Young's modulus (MPa) of the material of the joint
W: box outer diameter (mm)
DI: pin inner diameter (mm)
dp: pitch circle diameter (mm) of the thread
$La^2$: $(dp^2 - DI^2)$
$Lb^2$: $(W^2 - dp^2)$ The thread interference amount is smaller than the interference amount of the metal seal portion.

(iii) The length of complete thread engagement of the male thread of the pin portion and the female thread of the box portion at the time of coupling is
  (a) at least 3 times the pipe body wall thickness when the ratio of the pipe wall thickness to the pipe outer diameter is at least 0.096,
  (b) at least 4 times the pipe body wall thickness when the ratio of the pipe wall thickness to the pipe outer diameter is at least 0.084 and less than 0.096,
  (c) at least 5 times the pipe body wall thickness at times other than (a) or (b).
However, when the ratio of the pipe wall thickness to the pipe outer diameter is at most 0.052, the seal lip inner diameter of the pin portion is made at most the pipe inner diameter within a permissible range.

(iv) The shoulder angle $\theta_1$ of the torque shoulder is made 5–20°, and the lip thickness ratio (X) of the root thickness (lt) of the lip portion of the seal lip and the pipe wall thickness (t) which is defined by the following equation is made at least 0.52.

$$(lt/DB)/(t/OD) \geq 0.52 \quad (3)$$

Here, DB is the outer diameter of the root of the lip portion, and OD is the pipe outer diameter.

When t/OD is small and t is thin, the lip thickness ratio which is prescribed in the above manner is made to be at least 0.52 by preworking such as swaging of the pipe end.

(v) Each factor which determines the shape of the unthreaded portion of the end of the pin portion and the unthreaded portion of the rear of the box portion, i.e., the lip length l(mm), the seal length $S_P$ (mm), the seal taper Ts, the shoulder angle $\theta_1$ (°), and the lip thickness ratio (X) are in the below-described ranges, and the function f which is a linear polynomial based on these and the like is greater than 1.2.

6 mm≦l(mm)≦30 mm, 3 mm≦$S_P$ (mm)≦10 mm $\frac{1}{16}$≦Ts≦1, 0°≦$\theta_1$(°)≦20°, 0.25≦X≦0.75

Here, $$f = -3.26 \times 10^{-1} + 3.19 \times 10^{-2} \times \theta_1 + 1.43 \times X - 4.67 \times 10^{-4} \times l + 8.39 \times 10^{-2} \times S_P - 6.22 \times 10^{-1} \times Ts \quad (4)$$

X={(wall thickness of the root of the lip portion on the pin side)/(outer diameter of the root of the lip portion}/{(wall thickness of the pipe body)/(outer diameter of the pipe body)}

With such a structure, a threaded joint for an oil well pipe having a desired performance can in fact be provided. However, an enormous amount of effort is required in order to design the dimension of each portion for actually manufacturing a threaded joint for an oil well pipe according to this proposal.

An object of the present invention is to provide a concrete method by which one skilled in the art can easily manufacture a threaded joint for an oil well pipe, and specifically a threaded joint having a strength which is comparable to or higher than that of a pipe body with respect to various external forces.

A more specific object of the present invention is to provide a method by which a person skilled in the art can easily design and manufacture the threaded joint proposed in Japanese Patent Application Hei 11-183148/1999.

Below, the above-described joint proposed in Japanese Patent Application Hei 11-183148 will be referred to as the "preceding threaded joint".

In order to solve the above-described problems, the present inventors constructed a method of designing this threaded joint by analyzing and reconstructing the preceding threaded joint, and they completed the present invention.

By determining the dimensions of each part by this design process, a person skilled in the art can easily design and manufacture a high strength threaded joint exhibiting excellent leak resistance with respect to internal and external pressures.

As shown FIG. 2 which is described below, the present invention is a method of manufacturing a threaded joint for a pipe having a pin portion having a male thread comprising a tapered thread with a thread cross-sectional shape which is roughly trapezoidal, and a box portion having a female thread which engages with the male thread and which comprises a tapered thread with a thread cross-sectional shape which is roughly trapezoidal, a metal seal portion comprising an unthreaded portion for forming the metal seal portion provided on the pin portion and an unthreaded portion provided on the box portion for forming the metal seal portion which abuts the above-described unthreaded portion for forming the metal seal portion, a torque shoulder portion comprising an unthreaded portion for forming the torque shoulder portion provided on the end of the pin portion and an unthreaded portion provided on the box portion for forming the torque shoulder portion which abuts the above-described unthreaded portion for forming the torque shoulder portion, characterized by determining the dimensions of each portion by determining the outer diameter (OD) and the pipe wall thickness (t) of a pipe having the pin portion, provisionally determining the allowable range for the complete engagement thread length of the pin portion and the box portion based on the determined pipe outer diameter (OD) and the pipe wall thickness (t), and provisionally determining the complete engagement thread length (L) based on the provisionally determined allowable range, determining the lip inner diameter ($D_2$) of the pin portion based on the determined pipe outer diameter (OD) and the pipe wall thickness (t), and determining the inner diameter ($D_1$) of the box portion based on the determined lip inner diameter ($D_2$) of the pin portion, provisionally determining the lip thickness ratio (X) based on the determined pipe outer diameter (OD) and pipe wall thickness (t), provisionally determining the lip thickness (lt) of the pin portion and the lip root outer diameter (DB) of the pin portion based on the provisionally determined lip thickness ratio (X), and determining the thread engagement height (h) and the thread pitch (P) based on the determined pipe outer diameter (OD) and pipe wall thickness (t), provisionally determining the thread taper (Tt) based on the determined pipe outer diameter (OD) and pipe wall thickness (t), and on the provisionally determined lip outer diameter (DB) of the pin portion, the thread engagement height (h) and the complete engagement thread length (L), determining the lip length (l), the seal length ($S_P$) of the pin portion, the seal taper (Ts), the shoulder angle ($\theta_1$) and the lip thickness ratio (X) based on the provisionally determined lip thickness (lt) of the pin portion and the provisionally determined lip root outer diameter (DB) of the pin portion such that a function f is greater than 1.2, and thereby determining the shape of the pin lip, and determining the lip thickness (lt) of the pin portion and the lip outer diameter (DB) of the pin portion, and also determining the diameter of the end of the lip portion (Papex), determining the thread taper (Tt) and the complete engagement thread length (L) based on the determined lip thickness (lt) of the pin portion, and the lip root outer diameter (DB) and the thread engagement height (h) of the pin portion, and determining the thread parallel portion diameter (DA) of the box portion, and determining the load flank angle ($\alpha$), the stabbing flank angle ($\beta$), the gap ($\delta$) between the stabbing flanks, and the gap ($\gamma$) between the thread crests, and determining the shape of the seal portion including the seal length ($S_B$) of the box portion based on the seal length ($S_P$) of the box portion and the dimensions of each portion of the pin portion.

Other items may be suitably determined. For example, the pitch diameter (Dp) can be determined by the determined pipe outer diameter (OD), the pipe wall thickness (t), and the thread engagement height (h), the outer diameter (W) of the box portion and the location (LPt) of the pitch diameter of the pin portion may be determined, and the amount of thread interference (It) may be determined based on the determined pitch diameter (Dp), the shoulder depth (LB) of the box portion may be determined based on these, the shoulder length (IRes) may be determined based on the determined pipe outer diameter (OD) and the pipe wall thickness (t), the overall length (NL) of the box portion may be determined based on the determined shoulder length (IRes) of the box portion and the shoulder depth (LB) of the box portion, and the location (LBt) of the pitch diameter of the box portion may be determined by the complete engagement thread length (L), the lip length (l) of the pin portion, the pitch diameter (Dp), and the thread interference amount (It).

BEST MODE FOR CARRYING OUT THE INVENTION

An embodiment of a method of manufacturing a threaded joint for an oil well pipe according to the present invention will be explained in detail while referring to the attached drawings.

Figure 2:
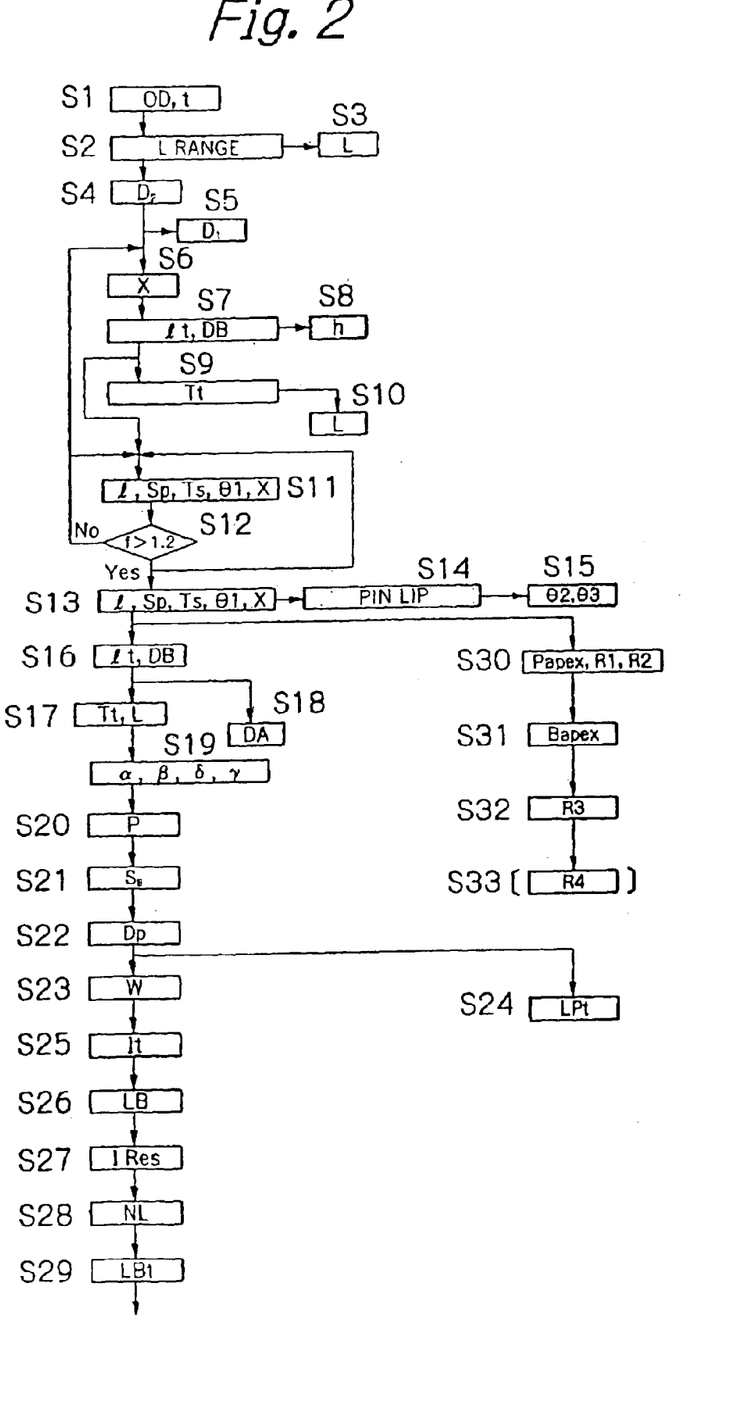
FIG. 2 is a flow chart showing an example of an embodiment of a process of designing a threaded joint for an oil well pipe.

FIG. 2 is a flowchart showing an example of a process of designing a threaded joint for an oil well pipe in this embodiment.

A threaded joint for an oil well pipe according to the present invention is the preceding threaded joint. Namely, it is a threaded joint for an oil well pipe having (i) a pin portion having a male thread comprising a tapered thread having a thread cross-sectional shape which is roughly trapezoidal, and a box portion having a female thread which engages with the male thread and which comprises a tapered thread having a thread cross-sectional shape which is roughly trapezoidal, (ii) a metal seal portion comprising an unthreaded portion for forming a metal seal portion provided on the pin portion and an unthreaded portion provided on the box portion for forming a metal seal portion which abuts the above-mentioned unthreaded portion for forming a metal seal portion, and (iii) a torque shoulder portion comprising an unthreaded portion for forming the torque shoulder portion provided on the end of the pin portion and an unthreaded portion provided on the box portion for forming the torque shoulder portion which abuts the above-mentioned unthreaded portion for forming the torque shoulder portion.

According to this embodiment, when this threaded joint is designed, the following Step 1 through Step 29 (described below simply as S1–S29) are followed.

In S1, the pipe outer diameter (OD) and the pipe wall thickness (t) of a pipe having the pin portion are determined. The pipe outer diameter (OD) and the pipe wall thickness (t) are determined by the outer diameter and wall thickness of the pipe body needing this threaded joint. After determining the necessary pin portion outer diameter, the corresponding pipe wall thickness is determined.

In S2, the complete engagement thread length of the pin portion and the box portion is provisionally determined based on the determined pipe outer diameter (OD) and pipe wall thickness (t).

The allowable range for the complete engagement thread length of the pin portion and the box portion is, for example, at least 3 times the pipe wall thickness (t) when {pipe wall thickness (t)/pipe outer diameter (OD)} is at least 0.096, at least 4 times the pipe wall thickness (t) when {pipe wall thickness (t)/pipe outer diameter (OD)} is at least 0.084, at least 5 times the pipe wall thickness (t) when {pipe wall thickness (t)/pipe outer diameter (OD)}is at least 0.052, and at least 5 times the pipe wall thickness (t) when {pipe wall thickness (t)/pipe outer diameter (OD)} is less than 0.052, and the lip inner diameter ($D_2$) of the pin portion is set to be less than or equal to the pipe inner diameter (DI).

In S3, the complete engagement thread length (L) is provisionally determined based on the allowable range for the complete engagement thread length determined in S2.

In S4, the lip inner diameter ($D_2$) of the pin portion is determined. This determination is carried out by the worker based on his working ability.

In S5, the inner diameter ($D_1$) of the box portion is found based on the lip inner diameter ($D_2$) determined in S4 as lip inner diameter ($D_2$)+α. Here, α is a set value related to the seal interference amount which is set by the designer himself.

In S6, the lip thickness ratio (X) is provisionally determined.

In S7, the lip thickness (lt) of the pin portion and the outer diameter (DB) of the lip portion are provisionally determined based on the lip thickness ratio (X) which is provisionally determined in S6.

Specifically, the lip thickness (lt) of the pin portion is found from the following Equation 5.

$$lt = X \cdot (t/OD) \cdot D_2 / \{1 - 2 \cdot X(t/OD)\} \quad (5)$$

In addition, the lip outer diameter (DB) of the pin portion is found from the following Equation 6.

$$DB = D_2 + 2lt \quad (6)$$

In S8, the thread engagement height (h) is provisionally determined. The thread engagement height (h) is set by the designer himself as a constant based on the pipe outer diameter (OD), or on the pipe outer diameter (OD) and the pipe wall thickness (t). For example, h is set to 1.016 when OD≦4½ inches, h=1.575 when 4½ inches<OD≦7¾ inches, and h=1.982 when 7¾ inches<OD≦14 inches.

In S9, the thread taper (Tt) is provisionally determined based on the determined pipe outer diameter (OD), the provisionally determined pin lip outer diameter (DB) which is the location of the pin lip root, and the complete engagement thread length (L). The thread taper (Tt) is found from the following Equation 7, for example.

$$1/Tt = (OD - DB - 2c - 2h31\ 2\epsilon)/L \quad (7)$$

The symbol c is ½ of the difference between the thread root diameter and the lip root outer diameter of the pin portion at the location of the lip root of the pin portion and is determined by the designer. The symbol ε is the difference between the diameter of the thread crest portion at the location of the lip root and the diameter of the thread bevel top portion.

In S10, the complete engagement thread length (L) is provisionally determined. Specifically, it is found from the following Equation 8 so as to satisfy the conditions in S2.

$$L = (OD - DB - 2c - 2h - 2\epsilon) \cdot Tt \quad (8)$$

In S11 and S12, the lip length (l), the seal length of the pin portion ($S_P$), the seal taper (Ts), the shoulder angle ($\theta_1$), and the lip thickness ratio (X) are provisionally determined based on the provisionally determined lip thickness (lt) of the pin portion and pin lip outer diameter (DB) which is the lip root outer diameter so that the function f is greater than 1.2.

Specifically, the function f is found from the following Equation 9.

$$f = -3.26 \times 10^{-1} + 3.19 \times 10^{-2}(\theta_1) + 1.43(X) - 4.67 \times 10^{-4}(l) + 8.39 \times 10^{-2}(S_P) - 6.22 \times 10^{-1}(Ts) \quad (9)$$

wherein 5°≦$\theta_1$≦20°, 0.52≦X≦0.75, 6 mm≦l≦30 mm, 3 mm≦$S_P$≦10 mm, and 1≦Ts≦16.

In S13, S14, S15, the shape of the pin lip is determined based on the lip length (l), the seal length ($S_P$) of the pin portion, the seal taper (Ts), the shoulder angle ($\theta_1$), and the lip thickness ratio (X) which were provisionally determined in S12, and the angle of the bevel portion at the start of cutting of the thread of the pin portion ($\theta_2$) and the cutting angle of the inner surface of the pin portion ($\theta_3$) are determined.

In S16, the lip thickness (lt) of the pin portion and the lip root outer diameter (DB) of the pin portion are determined based on the lip length (l), the seal length ($S_P$) of the pin portion, the seal taper (Ts), the shoulder angle ($\theta_1$), and the lip thickness ratio (X) which were provisionally determined in S12.

In S17, the thread taper (Tt) and the complete engagement thread length (L) are determined based on the lip thickness (it) and the lip root outer diameter (DB) which were determined in S16.

In S18, the diameter of the thread parallel portion of the box portion (DA) is determined based on the lip thickness (lt) of the pin portion and the lip root outer diameter (DB) of the pin portion which were determined in S16.

Specifically, the diameter of the thread parallel portion of the box portion (DA) is found from the following Equation 10.

$$DA = DB + 2d \quad (10)$$

Here, symbol d is a constant indicating the difference between the lip root outer diameter of the pin portion and the diameter of the thread parallel portion of the box portion DA. It is set by the designer to a value such as d=0.2 mm.

In S19, the load flank angle (α), the stabbing flank angle (β), the gap between the stabbing flanks (δ), and the gap between the thread crests (γ) are determined. Specifically, the stabbing flank angle β is found from the following Equation 11.

$$\beta \leq \tan^{-1}\left[\frac{\gamma \tan(\alpha)}{\delta \tan(\alpha) - \gamma}\right] \quad (11)$$

wherein 0>α>−20°, γ is an extremely small value, 25°<β<45°, and δ is an extremely small positive value which is within a range in which the worker can perform processing and which is selected taking costs and performance into consideration.

In S20, the thread pitch (P) is determined. Specifically, the thread pitch (P) is set as a constant based on the pipe outer diameter (OD), or on the pipe outer diameter (OD) and the pipe wall thickness (t). For example, P=8 crests when OD is at least 2 inches and less than 2⅞ inches, P=6 crests when OD is at least 2⅞ inches and less than 4½ inches, P=5 crests when OD is at least 4½ inches and less than 8⅝ inches, and P=4 crests when OD is at least 8⅝ inches and at most 14 inches.

In S21, the seal length ($S_B$) of the box portion is determined.

Specifically, when $S_B > S_P$, then $S_B > S_P + 2.0$, and the seal length ($S_B$) of the box portion is found from the following Equation 12, and when $S_B \leq S_P$, it is found from the following Equation 13.

$$S_B > I_S \cdot T_S + S_P + R_4 \cdot \tan [90 - \tfrac{1}{2}$$
$$\{90 + \tan^{-1}[1/(2T_S)] + \theta_S$$
$$\}] \cdot \cos \{\tan^{-1}[1/(2T_S)]\} \tag{12}$$
$$P_S - \cos \{\tan^{-1}[1/(2T_S)]\} \cdot$$
$$[R_1 \cdot \tan [90 - \tfrac{1}{2}\{180$$
$$- \tan^{-1}[1/(2T_S)]$$
$$+ \tan^{-1}[1/(2T_D)]\}]$$
$$+ R_4 \cdot \tan [90 - \tfrac{1}{2}\{90$$
$$- \tan^{-1}[1/(2T_S)]$$
$$+ \theta_S\}] \geq S_B \geq I_S \cdot T_S$$
$$+ \cos \{\tan^{-1}[1/(2T_S)]\} \cdot$$
$$[R_2 \cdot \tan [90 - \tfrac{1}{2}\{90$$
$$+ \tan^{-1}[1/(2T_S)] - \theta_1\}]$$
$$+ R_4 \cdot \tan [90 - \tfrac{1}{2}\{90$$
$$- \tan^{-1}[1/(2T_S)] + \theta_S$$
$$\}]] \tag{13}$$

Here, Is indicates the seal interference amount, $T_D$ indicates the taper of the pin lip portion (not of the seal portion), and $\theta_5$ indicates the angle of the opening of the box seal portion.

In S22, the pitch diameter (Dp) is determined.

Specifically, the pitch diameter Dp is found from the following Equation 14.

$$Dp = (OD + \mu) - h \tag{14}$$

Here, $\mu$ is a value determined by API. For example, it is 0.009 inches when OD$\leq$4½ inches, and it is 0.016 inches when OD$\leq$14 inches.

In S23, the outer diameter (W) of the box portion is determined. The outer diameter W of the box portion is set so that the critical cross-sectional area of the box ($A_{BC}$) is larger than the standard cross-sectional area of the pipe ($A_{PC}$). The determination of the critical cross-sectional area of the box ($A_{BC}$) depends on ones view of where the critical cross-section is located, so it is determined by the designer.

In S24, the location of the pitch diameter of the pin portion (LPt) is determined. Specifically, the location of the pitch diameter of the pin portion LPt is found from the following Equation 15.

$$LPt = L + l + (h+c)/\{(1/\tan \theta_2) - (\tfrac{1}{2}Tt)\} \tag{15}$$

In S25, the thread interference amount (It) is determined. Specifically, the thread interference amount It is found from the following Equations 16 and 17.

$$It = \frac{\delta y \cdot La^2 \cdot (1 + DI^2/La^2 + dp^2/Lb^2)}{E \cdot dp} \tag{16}$$

$$It = \frac{2 \cdot \delta y \cdot Lb^2 \cdot dp \cdot (1 + DI^2/La^2 + dp^2/Lb^2)}{E \cdot (W^2 + dp^2)} \tag{17}$$

wherein $\delta y$ indicates the yield strength (MPa) of the material, E indicates the Young's modulus (MPa) of the joint material, W indicates the box outer diameter (mm), DI indicates the inner diameter (mm) of the pin, dp indicates the pitch circle diameter (mm) of the thread, $La^2$ indicates ($dp^2 - DI^2$), and $Lb^2$ indicates ($W^2 - dp^2$).

In S26, the shoulder depth of the box portion (LB) is determined. Specifically, the shoulder depth of the box portion LB is found from the following Equation 18.

$$LB = l + L + (h+c)/\{(1/\tan \theta_1) - (\tfrac{1}{2}Tt)\} + 2 \cdot (h+2\gamma) \cdot Tt + (h+2\gamma)/\{\tan \theta_4 - 1/(2 \cdot Tt)\} \tag{18}$$

Here, $\theta_4$ is the angle of the bevel on the inner surface on the end of the box portion.

In S27, the shoulder length of the box portion (IRes) is determined.

In S28, the total length of the box portion (NL) is determined based on the determined shoulder length of the box portion (IRes). Specifically, the total length of the box portion NL is found from the following Equation 19.

$$NL = 2LB + IRes \tag{19}$$

In S29, the location of the pitch diameter of the box portion (LBt) is determined. Specifically, the location of the pitch diameter of the box portion (LBt) is found from the following Equation 20.

$$LBt = l + L + (h+c)/\{(1/\tan \theta_2) - (\tfrac{1}{2}Tt)\} - (It \cdot Tt) \tag{20}$$

In S30, the diameter of the end of the lip portion (Papex), the radius of the seal parallel portion of the pin portion ($R_1$), and the radius of the end of the seal of the pin portion ($R_2$) are determined. Specifically, the diameter of the end of the lip portion (Papex) is found from the following Equations 21 or 21'.

$$Papex = DB - S_P/Ts \tag{21}$$

$$Papex = DB - (l - S_P - l')/T_D - S_P/Ts \tag{21'}$$

Equation 21 is employed when a portion other than the seal portion of the pin seal lip portion is parallel (when there is a pin seal parallel portion), and Equation 21' is employed when there is a taper outside the seal portion of the pin seal lip portion (when there is a taper portion in place of the pin seal parallel portion or when there is both a parallel portion and a tapered portion).

Here, l' indicates the length of the parallel portion of the pin lip portion.

The radius of the seal portion of the pin portion ($R_1$) is found from the following Equation 22 or Equation 22'.

$$R_1 \geq 1.0/\tan [(\tfrac{1}{2}) \cdot \tan^{-1}(\tfrac{1}{2}Ts)] \tag{22}$$

$$R_1 \geq 1.0/\tan [(\tfrac{1}{2})\{\tan^{-1}(\tfrac{1}{2}Ts) - \tan^{-1}(\tfrac{1}{2}T_P)\}] \tag{22'}$$

The radius of the end of the seal of the pin portion ($R_2$) is set by the designer himself.

In S31, the diameter of the end of the seal of the box portion (Bapex) is determined based on the determined diameter of the end of the lip portion (Papex), the radius of the seal parallel portion of the pin portion ($R_1$), and the radius of the end of the seal of the pin portion ($R_2$). Specifically, the diameter of the end of the seal of the box portion Bapex is found from the following Equation 23.

$$\text{Bapex} = \text{Papex} - Is \quad (23)$$

Here, Is indicates the seal interference amount.

In S32, the radius of the end of the seal of the box portion $R_3$ is determined so as to be smaller than the determined radius of the end of the seal of the pin portion ($R_2$).

In S33, if necessary, the radius of the seal root of the box portion ($R_4$) is determined.

In this manner, in this embodiment, the dimensions of each portion of a threaded joint are determined. If the dimensions of each portion of a threaded joint are set according to the procedure of this embodiment, the preceding threaded joint for an oil well pipe can be easily and accurately designed and manufactured by one skilled in the art.

Figure 3:
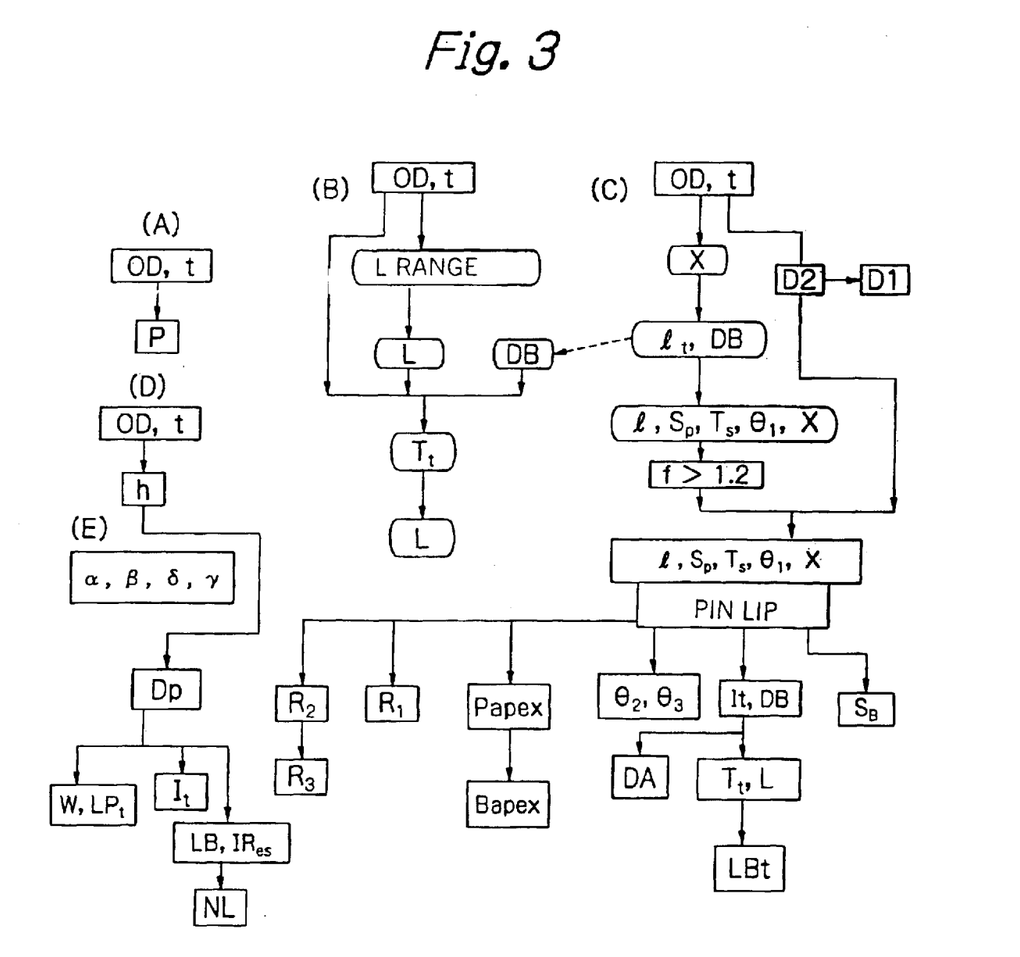
FIG. 3 is a flow chart showing another example of a process of designing an embodiment of a threaded joint for an oil well pipe.

FIG. 3 shows another mode of the present invention. When manufacturing a threaded joint for pipes having a pin portion with a male thread comprising a tapered thread with a thread cross-sectional shape which is roughly trapezoidal, and a box portion with a female thread which engages with the male thread and which comprises a tapered thread with a thread cross-sectional shape which is roughly trapezoidal, a metal seal portion comprising an unthreaded portion for forming a metal seal portion provided on the pin portion and an unthreaded portion provided on the box portion for forming a metal seal portion which abuts the above-described unthreaded portion for forming a metal seal portion, and a torque shoulder portion comprising an unthreaded portion for forming a torque shoulder portion provided on the end of the pin portion and an unthreaded portion provided on the box portion for forming a torque shoulder portion which abuts the above-described unthreaded portion for forming a torque shoulder portion, by carrying out the below-described First Step A through the below-described Fifth Step E, the dimensions of each portion are determined. In the figures, (A)–(E) correspond to Steps A–E.

First Step A:

The pipe outer diameter (OD) and the pipe wall thickness (t) of a pipe having the pin portion are determined, and the thread pitch (P) is determined based on the determined pipe outer diameter (OD) and pipe wall thickness (t).

Second Step B:

The allowable range for the complete engagement thread length of the pin portion and the box portion is determined based on the determined pipe outer diameter (OD) and the pipe wall thickness (t), and the complete engagement thread length (L) is provisionally determined.

In the below-described Third Step C, the lip thickness ratio (X) is provisionally determined based on the determined pipe outer diameter (OD) and the pipe wall thickness (t), and the lip thickness of the pin portion (it) and the outer diameter of the lip root of the pin portion (DB) are provisionally determined based on the provisionally determined lip thickness ratio (X).

The thread taper (Tt) is provisionally determined based on the pipe outer diameter (OD) and the pipe wall thickness (t) which were determined in this manner and the provisionally determined complete engagement thread length (L) and the provisionally determined lip root outer diameter of the pin portion (DB).

Third Step C:

The lip inner diameter of the pin portion ($D_2$) is determined based on the determined pipe outer diameter (OD) and the pipe wall thickness (t), and the inner diameter ($D_1$) of the box portion is determined based on the determined lip inner diameter ($D_2$) of the pin portion.

The lip length (l), the seal length ($S_P$) of the pin portion, the seal taper (Ts), the shoulder angle ($\theta_1$) and the lip thickness ratio (X) are provisionally determined based on the provisionally determined lip thickness (lt) of the pin portion and the lip outer diameter (DB) of the pin portion such that a function f is greater than 1.2 to determine the shape of the pin lip, and based on the determined shape of the pin lip, (i) the lip thickness (lt) of the pin portion and the lip root outer diameter (DB) of the pin portion are determined, and the thread parallel portion diameter (DA) of the box portion, the thread taper (Tt), and the complete engagement thread length (L) are determined based on the lip thickness (lt) and the lip root outer diameter (DB) of the pin portion, and (ii) the shape of the seal portion including the seal length ($S_B$) of the box portion and the diameter of the end of the seal of the box portion (Bapex) is determined based on the dimensions of each portion of the seal portion of the pin portion.

The dimensions of other parts can be successively determined in the same manner.

Fourth Step D:

The thread engagement height (h) is determined based on the determined pipe outer diameter (OD) and the pipe wall thickness (t), the pitch diameter (Dp) is determined based on the thread engagement height (h), and based on the pitch diameter (Dp), (i) the outer diameter of the box portion (W) and the location of the pitch diameter of the pin portion (LPt) are determined, (ii) the thread interference amount (It) is determined, and (iii) the shoulder depth of the box portion (LB) and the shoulder length of the box portion (IRes) are determined, and the total length of the box portion (NL) is determined based on the shoulder depth of the box portion (LB) and the shoulder length of the box portion (IRes).

Fifth Step E:

The load flank angle ($\alpha$), the stabbing flank angle ($\beta$), the gap between the stabbing flanks ($\delta$), and the gap between thread crests ($\gamma$) are determined based on the determined pipe outer diameter (OD), the pipe wall thickness (t), the thread engagement height (h), and the thread pitch (P).

EXAMPLES

The present invention will be explained while referring to examples.

A threaded joint for an oil well pipe was designed according to the design procedure for a threaded joint for an oil well pipe shown in FIG. 2 and explained in the above-described mode of carrying out the invention.

The dimensions of the main portions of the pin portion and the box portion of the threaded joint for an oil well pipe which was designed in this manner were as follows.

L=51.1 mm, a=0.3 mm, c=0.24 mm, h=1.475 mm, $\theta_1$=15°, X=0.57, l=11.0 mm, $S_P$=6 mm, Ts=4, $\alpha$=−3°, $\gamma$=0.1 mm, $\beta$=35°, $\delta$=0.06 mm, P=5 crests, d=0.3 mm, $R_2$=1.0 mm, IRes=50.8 mm, Is=0.60 mm, $R_3$=0.9 mm, $R_4$=4.0 mm Here, a is the difference between $D_1$ (the inner diameter of the box portion) and $D_2$ (the inner diameter of the lip of the pin portion), c is ½ of the difference between the thread root diameter of the pin portion at the location of the lip root of the pin portion and the lip root outer diameter of the pin portion, and d is ½ of the difference between DA (the diameter of the thread parallel portion of the box portion) and DB (the lip root outer diameter of the pin portion).

This threaded joint for an oil well pipe has the characteristics that (1) it can withstand tensile force in the axial direction due to the weight of connected pipes, (2) it can withstand internal pressure due to internal fluids or external pressure due to external fluids, (3) it can be repeatedly used any number of times, (4) it has sufficient resistance with respect to twisting forces applied to pipes, and tensile forces and compressive forces produced by repeated heating and cooling and the like is during the development stage of a well or during operation of a well, and (5) it maintains sealing properties against internal and external pressure even when it repeatedly receives loads like those described above, and it was found that it satisfies all the requirements of the preceding threaded joint.

Industrial Applicability

The present invention can provide a concrete method by which a person skilled in the art can easily manufacture a threaded joint for pipe, and specifically a threaded joint having resistance which is the same as or better than that of a pipe body with respect to various external forces.

More specifically, the present invention can provide a method by which a person skilled in the art can easily design and manufacture the preceding threaded joint.

The significance of the present invention which has such effects is extremely great.

What is claimed is:

1. A method of manufacturing a threaded joint for a pipe having a pin portion with a male thread comprising a tapered thread with a thread cross-sectional shape which is roughly trapezoidal, and a box portion having a female thread which engages with the male thread and which comprises a tapered thread with a thread cross-sectional shape which is roughly trapezoidal, a metal seal portion provided on the pin portion and the box portion, a torque shoulder portion provided on the end of the pin portion and on a portion of the box portion which abuts therewith, characterized by determining the dimensions of each portion by:

determining the outer diameter (OD) and the pipe wall thickness (t) of a pipe having the pin portion, determining the lip inner diameter ($D_2$) of the pin portion based on the determined pipe outer diameter (OD) and pipe wall thickness (t), and determining the inner diameter ($D_1$) of the box portion based on the determined lip inner diameter ($D_2$) of the pin portion, provisionally determining a lip thickness ratio (X) based on the determined pipe outer diameter (OD) and pipe wall thickness (t), provisionally determining the lip thickness (lt) of the pin portion and the lip root outer diameter (DB) of the pin portion based on the provisionally determined lip thickness ratio (X), and determining the thread engagement height (h) and the thread pitch (P) based on the determined pipe outer diameter (OD) and pipe wall thickness (t), provisionally determining the thread taper (Tt) based on the determined pipe outer diameter (OD) and pipe wall thickness (t), and on the provisionally determined lip outer diameter (DB) of the pin portion, the provisionally determined complete engagement thread length (L) and the determined thread engagement height (h), determining the lip length (l), the seal length of the pin portion ($S_P$), the seal taper (Ts), the shoulder angle ($\theta_1$), and the lip thickness ratio (X) based on the provisionally determined lip thickness (lt) of the pin portion and the provisionally determined lip root outer diameter (DB) of the pin portion so that a function f is greater than 1.2, and thereby determining the shape of the pin lip, and determining the lip thickness (lt) of the pin portion and the lip outer diameter (DB) of the pin portion, and also determining the diameter of the end of the lip portion (Papex), determining the thread taper (Tt) and the complete engagement thread length (L) based on the determined lip thickness (lt) of the pin portion, the determined lip root outer diameter (DB) and the determined thread engagement height (h) of the pin portion, and determining the thread parallel portion diameter (DA) of the box portion, and determining the load flank angle ($\alpha$), the stabbing flank angle ($\beta$), the gap ($\delta$) between the stabbing flanks, and the gap ($\gamma$) between the thread crests, and determining the shape of the seal portion including the seal length ($S_B$) of the box portion based on the seal length ($S_P$) of the pin portion and the dimensions of each portion of the pin portion.

2. A method of manufacturing a threaded joint for a pipe as set forth in claim 1 wherein the allowable range for the complete engagement thread length (L) of the pin portion and the box portion is at least 3 times the pipe wall thickness when {pipe wall thickness (t)/pipe outer diameter (OD)} is at least 0.096, it is at least 4 times the pipe wall thickness when {pipe wall thickness (t)/pipe outer diameter (OD)} is at least 0.084, it is at least 5 times the pipe wall thickness when {pipe wall thickness (t)/pipe outer diameter (OD)} is at least 0.052, it is at least 5 times the pipe wall thickness when {pipe wall thickness (t)/pipe outer diameter (OD)} is less than 0.052, and the lip inner diameter ($D_2$) of the pin portion is less than or equal to pipe inner diameter ($D_1$).

3. A method of manufacturing a threaded joint for a pipe as set forth in claim 1 wherein the lip thickness (lt) of the pin portion is found by the following Equation 5:

$$lt = X \cdot (t/OD) \cdot D_2 / \{1 - 2 \cdot X(t/OD)\} \quad (5)$$

4. A method of manufacturing a threaded joint for a pipe as set forth in claim 1 wherein the thread engagement height (h) is determined based on the pipe outer diameter (OD) or the pipe outer diameter (OD) and pipe wall thickness (t).

5. A method of manufacturing a threaded joint for a pipe as set forth in claim 1 wherein the thread taper (Tt) is found by the following Equation 7:

$$1/Tt = (OD - DB - 2c - 2h - 2\epsilon)/L \quad (7)$$

wherein c is ½ of the difference between the thread root diameter and the lip outer diameter of the pin portion at the location of the lip root of the pin portion, and $\epsilon$ is the difference in the radius of the thread crest portion and the thread bevel top portion at the location of the lip root.

6. A method of manufacturing a threaded joint for a pipe as set forth in claim 1 wherein the complete engagement thread length (L) is found by the following Equation 8.

$$L = (OD - DB - 2c - 2h - 2\epsilon) \cdot Tt \quad (8)$$

7. A method of manufacturing a threaded joint for a pipe as set forth in claim 1 wherein the function f is found from the following Equation 9:

$$f = -3.26 \times 10^{-1} + 3.19 \times 10^{-2}(\theta_1) + 1.43(X) - 4.67 \times 10^{-4}(l) + 8.39 \times 10^{-2}(S_P) - 6.22 \times 10^{-1}(Ts) \quad (9)$$

wherein $5° \leq \theta_1 \leq 20°$, $0.52 \leq X \leq 0.75$, $6 \text{ mm} \leq l \leq 30 \text{ mm}$, $3 \text{ mm} \leq S_P \leq 10 \text{ mm}$, and $1 \leq Ts \leq 16$.

8. A method of manufacturing a threaded joint for a pipe as set forth in claim 1 wherein the stabbing flank angle $\beta$ is found from the following Equation 11:

$$\beta \leq \tan^{-1}\left[\frac{\gamma \tan(\alpha)}{\delta \tan(\alpha) - \gamma}\right] \quad (11)$$

wherein $0° > \alpha > -20°$, $\gamma$ is an extremely small value, $25° < \beta < 45°$, and $\delta$ is an extremely small positive value within a range which the worker can handle taking into consideration costs and performance.

9. A method of manufacturing a threaded joint for a pipe as set forth in claim 1 wherein the thread pitch (P) is determined based on the pipe outer diameter (OD) or the pipe outer diameter (OD) and pipe wall thickness (t).

10. A method of manufacturing a threaded joint for a pipe as set forth in claim 1 wherein when $S_B > S_P$, $S_B > S_P + 2.0$ and is found by the following Equation 12, and when $S_B \leq S_P$, it is found by the following Equation 13:

$$S_B > Is \cdot Ts + S_P + R_4 \cdot \tan[90 - \tfrac{1}{2}$$

$$\{90 + \tan^{-1}[1/(2Ts)] + \theta_5\}]$$

$$\cdot \cos\{\tan^{-1}[1/(2Ts)]\} \quad (12)$$

$$Ps - \cos\{\tan^{-1}[1/(2Ts)]\} \cdot [R_1 \cdot \tan$$

$$[90 - \tfrac{1}{2}\{180 - \tan^{-1}[1/(2Ts)]$$

$$+ \tan^{-1}[1/(2T_D)]\}] + R_4 \cdot \tan$$

$$[90 - \tfrac{1}{2}\{90 - \tan^{-1}[1/(2Ts)]$$

$$+ \theta_5\}]] \geq S_B \geq Is \cdot Ts$$

$$+ \cos\{\tan^{-1}[1/(2Ts)]$$

$$\} \cdot [R_2 \cdot \tan[90 - \tfrac{1}{2}\{90$$

$$+ \tan^{-1}[1/(2Ts)] - \theta_1\}]$$

$$+ R_4 \cdot \tan[90 - \tfrac{1}{2}\{90$$

$$- \tan^{-1}[1/(2Ts)] + \theta_5\}]] \quad (13)$$

wherein Is indicates the seal interference amount, $T_D$ indicates the taper of the pin lip tapered portion, and $\theta_S$ indicates the opening angle of the box seal portion.

11. A method of manufacturing a threaded joint for a pipe as set forth in claim 10 wherein the thread interference amount It is determined by the following Equations 16 or 17, wherein of the values calculated over the entire length by Equation 12 or Equation 13, the smallest value is made the upper limit of the thread interference amount It, and 5% of the upper limit is made the lower limit of the thread interference amount It:

$$It = \frac{\delta y \cdot La^2 \cdot (1 + DI^2/La^2 + dp^2/Lb^2)}{E \cdot dp} \quad (16)$$

-continued $$It = \frac{2 \cdot \delta y \cdot Lb^2 \cdot dp \cdot (1 + DI^2/La^2 + dp^2/Lb^2)}{E \cdot (W^2 + dp^2)} \quad (17)$$

wherein $\delta y$ indicates the yield strength (MPa) of the material, E indicates the Young's modulus (MPa) of the joint material, W indicates the box outer diameter (mm), DI indicates the inner diameter (mm) of the pin, dp indicates the pitch circle diameter (mm) of the thread, $La^2$ indicates $(dp^2 - DI^2)$, and $Lb^2$ indicates $(W^2 - dp^2)$.

12. A method of manufacturing a threaded joint for a pipe as set forth in claim 1 wherein the pitch diameter Dp is found by the following Equation 14:

$$Dp = (OD + \mu) - h \quad (14)$$

wherein $\mu$ is a constant which is set based on the outer diameter (OD) of the pipe.

13. A method of manufacturing a threaded joint for a pipe as set forth in claim 1 wherein the shoulder depth LB of the box portion is found from the following Equation 18:

$$LB = l + L + (h+c)/\{(1/\tan(\theta_1)) - (\tfrac{1}{2}Tt)\} + 2 \cdot (h+2\gamma) \cdot Tt + (h+2\gamma)/\{\tan(\theta_4) - 1/(2 \cdot Tt)\} \quad (18)$$

wherein $\theta_4$ is the angle of the inner bevel of the end surface of the box portion.

14. A method of manufacturing a threaded joint for a pipe as set forth in claim 1 wherein the diameter Bapex of the end of the seal of the box portion is found by the following Equation 23:

$$Bapex = Papex - Is \quad (23)$$

wherein Is indicates the amount of seal interference.

15. A method of manufacturing a threaded joint for a pipe as set forth in claim 1 wherein the pipe is an oil well pipe.

16. A method of manufacturing a threaded joint for a pipe having a pin portion with a male thread comprising a tapered thread with a thread cross-sectional shape which is roughly trapezoidal, and a box portion having a female thread which engages with the male thread and which comprises a tapered thread with a thread cross-sectional shape which is roughly trapezoidal, a metal seal portion provided on the pin portion and the box portion, a torque shoulder portion provided on the end of the pin and on a portion of the box portion which abuts therewith, characterized by determining the dimensions of each portion by performing the following Step 1 through Step 5:

Step 1:

Determining the outer diameter (OD) and the pipe wall thickness (t) of a pipe having the pin portion, and determining a thread pitch (P) based on the determined pipe outer diameter (OD) and pipe wall thickness (t).

Step 2:

Provisionally determining the completed engaged thread length (L) of the pin portion and the box portion based on the determined pipe outer diameter (OD) and pipe wall thickness (t), in the below-described Third Step, provisionally determining the lip thickness ratio (X) based on the determined pipe outer diameter (OD) and pipe wall thickness (t), and provisionally determining the lip thickness (lt) of the pin portion and the lip root outer diameter (DB) of the pin portion based on the provisionally determined lip thickness ratio (X), and provisionally determining the thread taper (Tt) based on the determined pipe outer diameter (OD) and pipe wall thickness (t), the provisionally determined complete engagement thread length (L) and the provisionally determined lip root outer diameter (DB) of the pin portion.

Step 3:

Determining the lip inner diameter ($D_2$) of the pin portion based on the determined pipe outer diameter (OD) and pipe wall thickness (t), and determining the inner diameter ($D_1$) of the box portion based on the determined lip inner diameter ($D_2$) of the pin portion, determining the shape of the pin lip by provisionally determining the lip length (l), the seal length ($S_P$) of the pin portion, the seal taper (Ts), the shoulder angle ($\theta_1$), and the lip thickness ratio (X) based on the provisionally determined lip thickness (lt) and lip outer diameter (DB) of the pin portion so that the function f is greater than 1.2, and based on the determined pin lip shape, (i) determining the lip thickness (lt) of the pin portion and the lip root outer diameter (DB) of the pin portion, determining the thread parallel portion diameter (DA) of the box portion based on the lip thickness (lt) and the lip root outer diameter (DB) of the pin portion, and determining the thread taper (Tt) and the complete engagement thread length (L), and (ii) determining the shape of the seal portion including the seal length ($S_B$) of the box portion and the diameter of the end of the seal (Bapex) of the box portion based on the dimensions of each portion of the seal portion of the pin portion.

Step 4:

Determining the thread engagement height (h) based on the determined pipe outer diameter (OD) and pipe wall thickness (t), determining the pitch diameter (Dp) based on the thread engagement height (h), and based on the pitch diameter (Dp):

(i) determining the box portion outer diameter (W) and the location of the pitch diameter (LPt) of the pin portion, (ii) determining the thread interference amount (It), and (iii) determining the shoulder depth (LB) of the box portion and the shoulder length (IRes) of the box portion, and determining the overall length (NL) of the box portion based on the shoulder depth (LB) of the box portion and the shoulder length (IRes) of the box portion.

Step 5:

Determining the load flank angle ($\alpha$), the stabbing flank angle ($\beta$), the gap ($\delta$) between the stabbing flanks, and the gap ($\gamma$) between the thread crests based on the determined pipe outer diameter (OD), the pipe wall thickness (t), the thread engagement height (h), and the thread pitch (P).

* * * * *